(12) United States Patent
Berthereau

(10) Patent No.: US 8,437,894 B2
(45) Date of Patent: May 7, 2013

(54) METHOD AND SYSTEM FOR IMPROVING THE PERFORMANCE OF AN AIRCRAFT UPON TAKE OFF

(75) Inventor: Mathieu Berthereau, Auterive (FR)

(73) Assignee: Airbus Operations (SAS), Toulouse Cedex (FR)

( * ) Notice: Subject to any disclaimer, the term of this patent is extended or adjusted under 35 U.S.C. 154(b) by 437 days.

(21) Appl. No.: 12/881,692

(22) Filed: Sep. 14, 2010

(65) Prior Publication Data

US 2011/0066306 A1  Mar. 17, 2011

(30) Foreign Application Priority Data

Sep. 16, 2009  (FR) ..................................... 09 04421

(51) Int. Cl.
*G06F 19/00* (2011.01)
*G06F 17/10* (2006.01)

(52) U.S. Cl.
USPC .................. 701/15; 701/11; 701/14; 701/16; 701/3; 701/301

(58) Field of Classification Search ........................ None
See application file for complete search history.

(56) References Cited

U.S. PATENT DOCUMENTS

| | | | |
|---|---|---|---|
| 3,691,356 A * | 9/1972 | Miller | 701/15 |
| 6,643,568 B2 | 11/2003 | Chatrenet et al. | |
| 6,691,004 B2 * | 2/2004 | Johnson et al. | 701/14 |
| 7,281,683 B2 | 10/2007 | Delaplace et al. | |
| 7,751,951 B2 | 7/2010 | Pitard et al. | |
| 2001/0056316 A1 * | 12/2001 | Johnson et al. | 701/14 |

* cited by examiner

*Primary Examiner* — Ian Jen
(74) *Attorney, Agent, or Firm* — Novak Druce Connolly Bove + Quigg LLP

(57) ABSTRACT

A method and system for improving aircraft performances during take-off is described. The system (1) can include means (4, 6, 7) for determining an optimised take-off position of the control surfaces (S1-Sn) of the aircraft, in the case where a regulatory safety criterion relating to the minimum gradient of climb with a breakdown engine is predominant.

8 Claims, 2 Drawing Sheets

METHOD AND SYSTEM FOR IMPROVING THE PERFORMANCE OF AN AIRCRAFT UPON TAKE OFF

CROSS-REFERENCE TO RELATED APPLICATIONS

This application claims priority to French Patent Application 0904421, filed Sep. 16, 2009, the entire contents of which are incorporated herein by reference.

FIELD OF THE INVENTION

This invention relates to a method and a system for improving the performance of an aircraft upon take-off, as well as an aircraft equipped with such system.

BACKGROUND OF THE INVENTION

It is known that modern aircrafts, particularly civil or military airplanes, are equipped with aerodynamic control surfaces (for example leading edge slats and trailing edge flaps arranged on the wings) which are able to have a predetermined high-lift take-off position, selected among several separate take-off positions (generally three). Each take-off position corresponds to predetermined deflections of the aerodynamic surfaces at predetermined deflection angles.

In addition, it is known that, before an aircraft take-off, the take-off performance is calculated according to the following steps:
  determining recommended values of the following speed parameters:
    the decision speed V1: before the aircraft reaches the speed V1, the pilots can decide to stop take-off while being sure that he can stop the aircraft before the end of the runway;
    the rotation speed VR, which corresponds to the speed at which an aircraft can lift its nose to take-off (that is it will have enough lift to tilt and fly without stall); and
    the initial rate of climb V2, which is defined as the safety speed to be maintained during the initial climb phase; and
  selecting the take-off position to be applied to the aerodynamic surfaces of said aircraft upon take-off.

Determining recommended values of speed parameters V1, VR and V2, as well as selecting the take-off positions to be applied, is performed in particular using a plurality of information relating to:
  the aircraft (take-off mass);
  the weather conditions (wind, rain on the runway, atmospheric pressure, outside temperature);
  the runway characteristics (length, condition).

Further, during these preliminary steps, regulatory safety criteria should be taken into account.

In particular, the recommended value of the initial rate of climb V2 should, for example, respect three regulatory safety criteria defined according to the standards in force. It should particularly be:
  at least equal to a first speed threshold, corresponding to 113% of the stall speed of the aircraft (or speed Vs1g), that is $V2 \geq 1.13 \cdot Vs1g$;
  at least equal to a second speed threshold, corresponding to 10% of the minimum control speed with a breakdown engine (or speed VMCA), that is $V2 \geq 1.1 \cdot VMCA$; and
    such that the minimum gradient of climb γ of the aircraft with a breakdown engine is at least equal to a predefined gradient threshold (as a function of the number of engines on the aircraft), that is for example $\gamma \geq 2.4\%$, for a twin engine aircraft, and $\gamma \geq 3\%$, for a four-engine aircraft.

The safety criterion relating to the minimum gradient of climb γ with a breakdown engine may be shown as a dominant criterion with respect to the two other above-mentioned safety criteria.

In this case, the drag of the aircraft becomes a determining parameter: by taking measures to reduce the drag strength, the initial gradient of climb of the aircraft during take-off can be increased, while maintaining a constant thrust of the engines.

In addition, in order to respect the safety criterion relating to the minimum gradient of climb γ, with a breakdown engine, it can be contemplated to increase the initial rate of climb V2 in order to reduce the drag of the aircraft. It is what is called in aeronautics a "speed extension". This way, the deviation between the speed V2 and the first speed threshold (1.13·Vs1g) is increased.

However, the increase of speed V2 requires increasing the rolling distance down the runway, which can be unfeasible on a short length runway. Thus, the length of the runway can limit the possible speed extension, and therefore, the allowable take-off mass of the aircraft.

Besides, when the safety criterion relating to the minimum gradient of climb γ with a breakdown engine is a predominant criterion with respect to both other beforementioned safety criteria, it can be considered to select another predetermined take-off position resulting in a high-lift, but less than that associated with the preceding selected take-off position.

However, since the number of predetermined high-lift take-off positions is generally limited (for example to three as previously indicated), when the selected take-off position is that which generates the lowest lift among all the predetermined high-lift take-off positions, one solution in order to meet the safety criterion relating to the minimum gradient of climb γ with a breakdown engine is to increase speed V2, but with the runway length drawback, as discussed above.

SUMMARY OF THE INVENTION

The object of this invention is to overcome these drawbacks.

For that purpose, according to the invention, the method for improving the performance of an aircraft upon the take-off phase, said aircraft being provided with aerodynamic control surfaces able to have a plurality of separate predetermined take-off positions, each of them corresponding to predefined deflections of said control surfaces,
a method wherein, before take-off, the following steps are performed automatically:
  a recommended value of the initial rate of climb of said aircraft is determined, such that at least the following regulatory safety criteria are respected upon take-off:
    said recommended value of the initial rate of climb is at least equal to a first predefined speed threshold which is a function of the stalling speed of said aircraft;
    said recommended value of the initial rate of climb is at least equal to a second predefined speed threshold which is a function of the minimum control speed with a breakdown engine;
    the minimum gradient of climb of said aircraft with a breakdown engine is at least equal to a predefined gradient threshold; and
  among said separate predetermined positions, a take-off position is selected and applied to said control surfaces.

Preferably, according to the invention, said method is remarkable in that:

in a preliminary step, it is checked whether the safety criterion relating to said minimum gradient of climb with a breakdown engine is predominant with respect to other safety criteria using a theoretical representation of the take-off mass variations of said aircraft according to the initial rate of climb thereof, combined with said selected take-off position; and in the case where the minimum gradient of climb with a breakdown engine is a predominant safety criterion, the following steps are performed:

i) a predefined value of the initial rate of climb is compared with said first speed threshold;

ii) when the deviation between the predefined value of said initial rate of climb and said first speed threshold is substantially different from zero, optimised deflection commands of said control surfaces are determined, defining an optimal take-off position, so as to reduce said deviation upon take-off, with these optimised deflection commands being such that they generate an optimised deflection of said control surfaces less than that of said selected positions; and iii) the optimised deflection commands thus determined are applied to said control surfaces, whatever said previously selected take-off position.

Thus, thanks to the invention, the possible deviation between the initial rate of climb of an aircraft and the first speed threshold associated with the selected take-off position can be used when the safety criterion relating to said minimum gradient of climb with a breakdown engine is predominant. Indeed, reducing the control surface deflection, with respect to the deflection corresponding to the selected take-off position leads to reducing the deviation between the initial rate of climb (which can remain unchanged after adapting the control surface deflection) and the first speed threshold (which is in turn changed after such adaptation). Such reduction of the control surface deflection (which can be considered in the case where said deviation is not null) generates a decrease of the drag of the aircraft.

Further, thanks to the invention, the reduced number of predetermined take-off positions which can be taken by the control surfaces of an aircraft is not limited anymore.

In addition, the reduction of the control surface deflection in accordance with the invention can be transparent for the aircraft pilots, that is it can be implemented without any further action from the pilots.

According to the invention, it is also contemplated to increase the take-off mass of an aircraft, when the safety criterion relative to the minimum gradient of climb with a breakdown engine is predominant. Such an increase of the take-off mass, which can be about several tons, is a function of the deviation between the initial rate of climb of the aircraft and the first speed threshold (that is the magnitude of the "speed extension"). Upon developing an aircraft, this mass increase can be distributed among the take-off capacity of the aircraft (it is direct gain of rate), the aerodynamic performance (for example by means of a less stringent aerodynamic surface profile of the aircraft) or the engine thrust (for example in the form of a reduction thereof, which can result in using lighter engines and reduced fuel consumption).

Besides, thanks to the invention, in the case where the safety criterion relating to said minimum gradient of climb with a breakdown engine is predominant, it can also be considered to allow, upon take-off, an actual value of the initial rate of climb which is lower than the initially determined recommended value, when the deviation between the initial rate of climb and said first speed threshold is reduced, but remains not null, after applying the optimised position to the control surfaces, for an unchanged take-off mass of the aircraft.

Preferably, at step ii), said optimised deflection commands are such that said deviation is substantially equal to zero. Thus, the best gradient of climb during take-off is obtained.

Further, at step ii), said optimised deflection commands can be determined on the basis of at least some of the following information:
the take-off mass of said aircraft;
the flight attitude of said aircraft;
the engine thrust level of said aircraft;
the initial rate of climb;
the outside temperature.

Advantageously, said theoretical representation can be formed by the three following successive segments:
a first vertical segment for which the regulatory safety criterion relating to said second predefined speed threshold is predominant;
a second intermediate segment for which the regulatory safety criterion relating to said first predefined speed threshold is predominant; and
a third segment for which the regulatory safety criterion relating to said minimum gradient of climb of said aircraft with a breakdown engine is predominant.

Thus, when the couple of values of take-off rate and initial rate of climb of an aircraft belongs to the third segment, the safety criterion relating to said minimum gradient of climb with a breakdown engine is predominant with respect to the other criteria.

Besides, according to the invention, steps i), ii) and iii) can be performed considering, as a predefined value:
either the recommended value of the initial rate of climb, determined before take-off. In this case, adapting the deflection of the control surfaces of an aircraft can be performed before take-off or during take-off, when the aircraft is still on the ground or flying;
or the actual value of the initial rate of climb upon take-off. In this case, determining the optimised deflection commands and adapting the control surface deflection thereof are performed once the aircraft is flying.

This invention further relates to a system for improving the performance of an aircraft during a take-off phase, said aircraft being provided with aerodynamic control surfaces able to have a plurality of separate predetermined take-off positions, each of which corresponds to predefined deflections of said control surfaces, and said system comprising the following means for which the corresponding operations are implemented, automatically, before take-off:

means for determining at least one recommended value of the initial rate of climb of said aircraft, such that at least the following regulatory safety criteria are respected during take-off:
    said recommended value of the initial rate of climb is at least equal to a first predefined speed threshold which is a function of the stalling speed of said aircraft;
    said recommended value of the initial rate of climb is at least equal to a second predefined speed threshold which is a function of the control minimum speed with a breakdown engine;
    the minimum gradient of climb of said aircraft with a breakdown engine is at least equal to a predefined gradient threshold; and
means for selecting, among said separate predetermined positions, a take-off position to be applied to said control surfaces; and
means for applying said selected take-off position to said control surfaces.

According to the invention, said system is remarkable:
in that said system further comprises:

means for checking, using a theoretical representation of the variations of the take-off mass of said aircraft according to the initial rate of climb thereof, combined with said selected take-off position, whether the safety criterion relating to said minimum rate of climb with a breakdown engine is predominant with respect to the other safety criteria; and means for comparing a predefined value of the initial rate of climb (recommended value or actual value) with said first speed threshold, in the case where the minimum gradient of climb with a breakdown engine is a predominant safety criterion; and means for determining, when the deviation between the predefined value of the initial rate of climb and said first speed threshold is substantially different from zero, optimised deflection commands of said control surfaces which define an optimised take-off position, such as to reduce said deviation upon take-off, these optimised deflection commands being such that they generate an optimised deflection of said control surfaces less than that of said selected take-off position;

and in that said application means are further formed for applying the optimised deflection commands thus determined to said control surfaces, whatever said previously selected take-off position.

This invention further relates to an aircraft which comprises a system of the above-mentioned type.

BRIEF DESCRIPTION OF THE DRAWINGS

The figures of the appended drawing will help better understand how the invention can be embodied. In these figures, identical references refer to similar elements.

DETAILED DESCRIPTION

Figure 1:
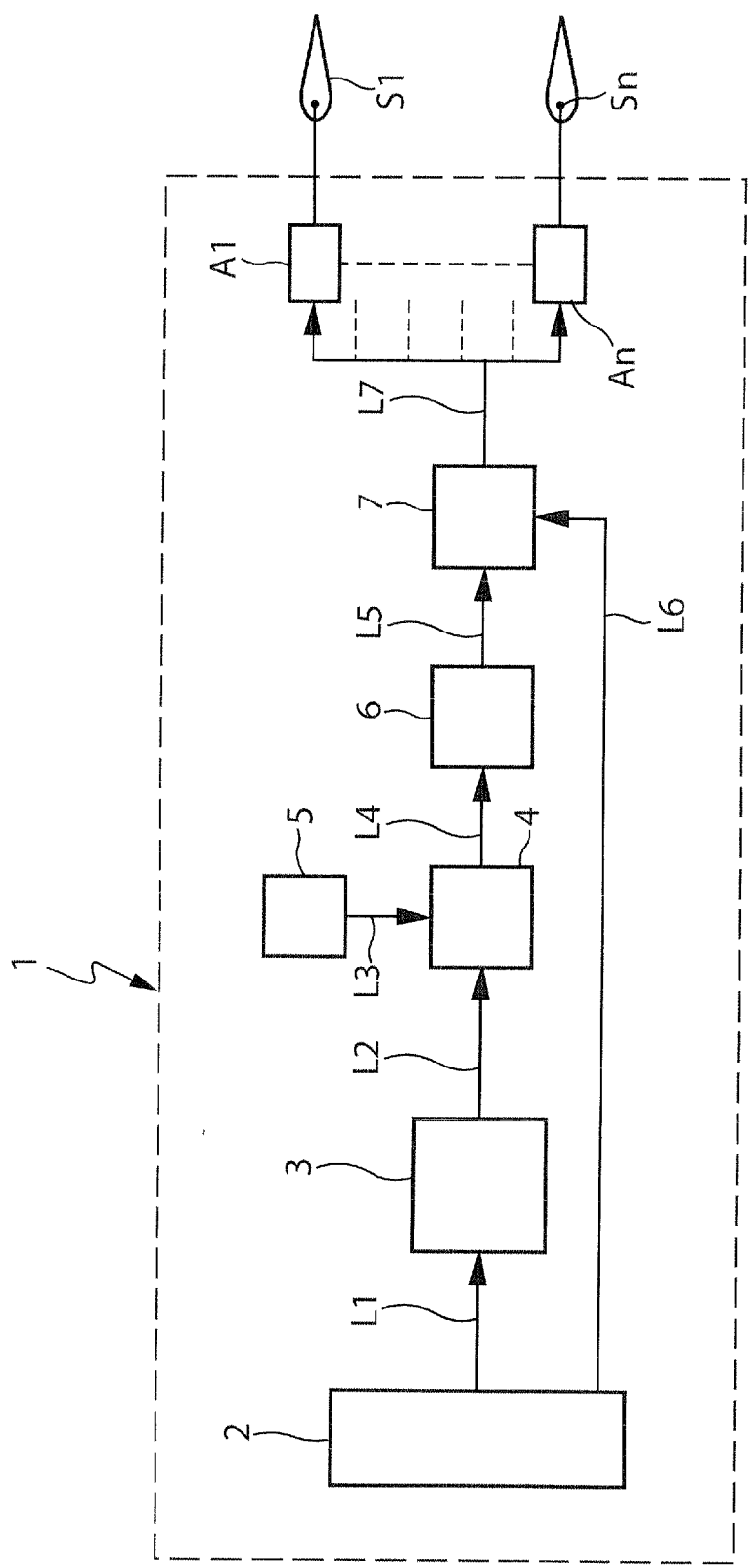
FIG. 1 shows an block diagram of a system for improving the take-off performance, in accordance of this invention, on board an aircraft (not shown).

The system 1, in accordance with the invention and schematically depicted in FIG. 1, is designed for improving the take-off performance of an aircraft, in particularly a civil or military transport airplane, which comprises aerodynamic control surfaces S1-Sn (n being an integer). These control surfaces S1-Sn are, for example, in the form of leading edge slats and trailing edge flaps arranged on the wings of the airplane.

Usually, the control surfaces S1-Sn are able to have, upon take-off, a determinist high-lift take-off position which is selected automatically, before take-off, from, for example, three separate take-off positions P1, P2 and P3. Each take-off position P1, P2, P3 corresponds to predefined deflections of the control surfaces S1-Sn at predetermined deflection angles. As an illustrative example, take-off position P1 is the one which generates the highest lift among the three take-off positions P1 to P3. On the contrary, position P3 is the one which generates the lowest lift.

As shown in FIG. 1, according to the invention, the system 1 comprises:

a set 2 of information sources which are likely to measure, usually, the values of parameters of the aircraft detailed below; and a usual take-off performance computer 3 for automatically determining, for a given take-off mass of the aircraft, the recommended values of the speeds V1, VR and V2 (previously defined) while meeting respectively associated regulatory safety criteria. It should be noticed that such a performance computer 3 can be taken on board the aircraft (when it is, for example, in the form of a laptop) or the outside thereof (it is then, for example, the operating department of the flight company using the airplane which has said computer).

In particular, the performance computer 3 determines the recommended value of the initial rate of climb V2 to be applied, automatically or manually, upon take-off, such that the following regulatory safety criteria are met upon take-off:

the recommended value of speed V is at least equal to a first predefined speed threshold, corresponding to 113% of the stall speed Vs1g of the airplane that is $V2 \geq 1.13 \cdot Vs1$. Further, it should be noticed that the stall speed Vs1g depends on the position of the control surfaces S1-Sn, such that said first speed threshold is also related thereto;

the recommended value of speed V2 is at least equal to a second speed threshold, corresponding to 10% of a minimum control speed with a breakdown engine VMCA, that is $V2 \geq 1.1 \cdot VMCA$; and the minimum gradient of climb $\gamma$ of the aircraft with a breakdown engine is at least equal to a predefined gradient threshold, which depends on the number of the engines on the airplane ($\gamma \geq 2.4\%$, for a twin engine aircraft, and $\gamma \geq 3\%$, for a four-engine airplane).

Further, the performance computer 3 is formed for selecting, from separate predetermined positions P1 to P3, the take-off position to be applied to said control surfaces S1-Sn upon take-off.

Determining recommended values of speed, V1, VR and V2, as well as selecting the take-off positions to be applied to the control surfaces S1-Sn are performed using a plurality of information, particularly relating to:

the airplane (take-off mass);

the weather conditions (wind, rain on the runway, atmospheric pressure, outside temperature);

the runway characteristics (length, condition), such information being received from set 2 of information sources, via a link L1.

Once the recommended values of speeds V1, VR, V2 are determined and a take-off position is selected by the take-off performance computer 3, the pilots enter, for example, the data in the flight management system (not shown) of the airplane through a multifunction control interface.

Besides, the system 1 also comprises usual operation means A1-An. Each of these operation means A1-An is associated with one of said control surfaces S1-Sn. These operation means A1-An are able to receive deflection commands and generate a deflection angle for each of said control surfaces S1-Sn, such deflection angle being in accordance with said received deflection command.

According to the invention, the system 1 further comprises means 4 for checking whether the safety criterion relating to the minimum gradient of climb with a breakdown engine is predominant with respect to the other above-mentioned safety criteria. If yes, it is a speed extension. The checking means 4 are connected to the performance computer 3 via a link L2, such that they are able to receive data determined thereby (recommended values for V1, VR and V2; selected take-off setting).

Figure 2:
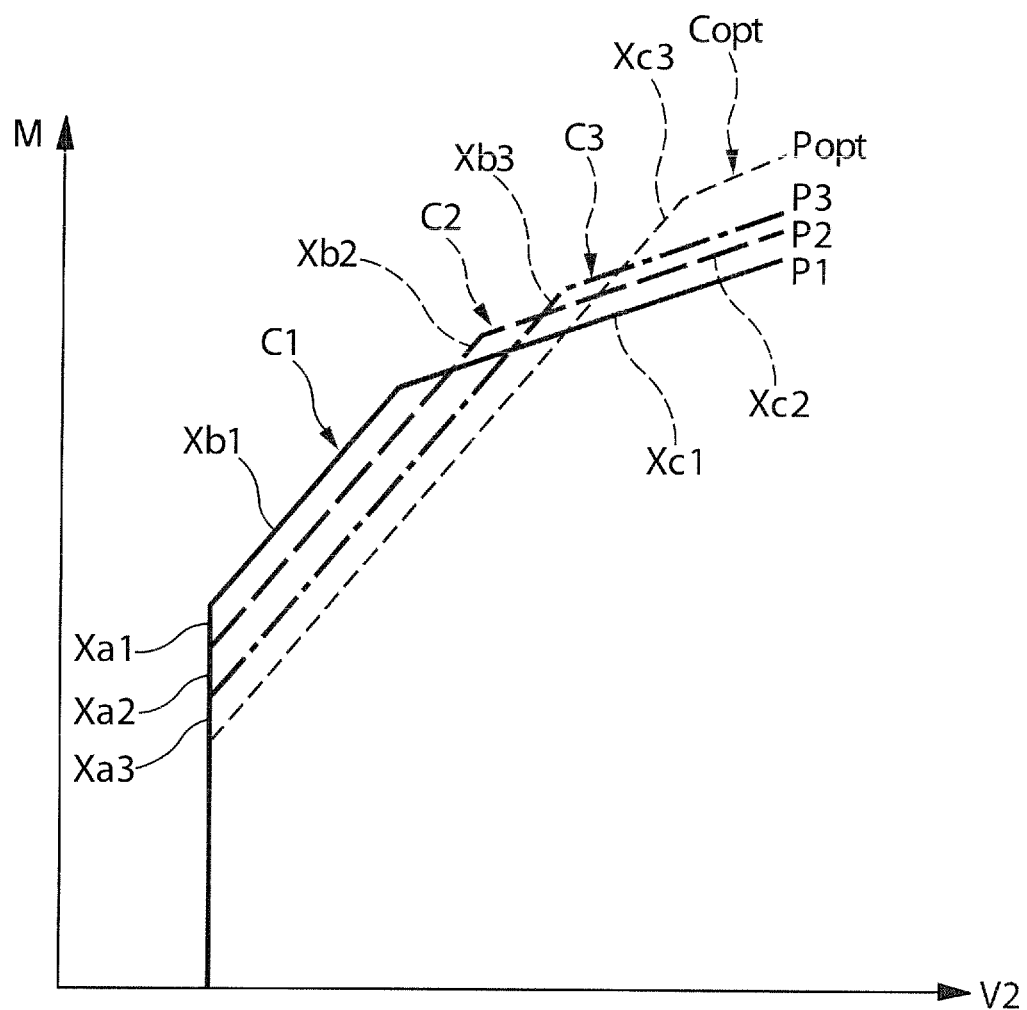
FIG. 2 is a diagram illustrating the variations of the take-off rate of an aircraft as a function of the initial rate of climb thereof, according to different take-off positions of the aerodynamic control surfaces thereof.

FIG. 2 depicts the variations C1, C2 and C3 of the mass M upon take-off of the airplane as a function of the initial rate of climb V2 thereof, for each of the three predetermined take-off positions P1-P3.

The variations C1-C3 are each formed by the three following successive segments:

a first vertical segment (respectively Xa1, Xa2. Xa3) for which the regulatory safety criterion relating to the second predefined speed threshold (equal to 1.1.VMCA) is predominant;

a second intermediate segment (respectively Xb1, Xb2, Xb3) for which the regulatory safety criterion relating to the first predefined speed threshold (equal to 1.13.Vs1g) is predominant; and a third segment (respectively Xc1, Xc2, Xc3) for which the regulatory safety criterion relating to said minimum gradient of climb of the airplane with a breakdown engine is predominant.

The variations C1-C3 are saved within storage means 5, belonging to the system 1, which are connected to the checking means 4, via a link L3.

Thus, according to the take-off position P1-P3 selected by the performance computer 3, the means 4 are able to check if the recommended value of the speed V2 (determined by the computer 3) belongs to the third segment Xc1, Xc2 or Xc3 of the corresponding variations C1, C2 or C3.

In the case where the recommended value of V2 belongs to the third segment of the corresponding variations, the means 4 are able to output a signal representative of the minimum gradient of climb of a breakdown engine being a predominant safety criterion.

In addition, the system 1 comprises:

means 6 for comparing the initial rate of climb V2 with a first speed threshold (equal to 1.13.Vs1g), in the case where the minimum rate of climb with a breakdown engine is a predominant safety criterion. The comparison means 6 are connected to the checking means 4 via a link L4, such that they can receive the information according to which the minimum gradient of climb with a breakdown engine is a predominant safety criterion. They are able to determine the deviation between speed V2 and said first speed threshold and to output a signal representative of this deviation; and means 7 for determining, when a deviation between the speed V2 and the first speed threshold (received from the means 6 via a link L5) is substantially different from zero, the optimised deflection commands of said control surfaces which define an optimised take-off position, such as to reduce said deviation upon take-off (by bringing it, preferably, to zero), these optimised deflection commands being such that they generate an optimised deflection of the control surfaces S1-Sn less than that associated with said previously selected take-off position. For that purpose, the determination means 7 are connected to the set 2 of information sources and to the comparison means 6, respectively via links L6 and L5. The optimised deflection commands can be determined on the basis of at least some of the following information received from set 2:

the take-off mass (M) of the airplane;
the flight attitude of the airplane;
the engine thrust level of the airplane;
the initial rate of climb V2;
the outside temperature;
other parameters entered by the airplane pilots.

Under the present invention, the application means A1-An are formed for applying the optimised deflection commands, determined by the means 7 (received via a link L7), to said control surfaces S1-Sn, whatever said selected take-off position, possibly taken by the control surfaces.

Under this invention, when the minimum gradient of climb with a breakdown engine is a predominant safety criterion, the comparison means 6 perform a comparison:

either of the recommended value of speed V2 (determined by the performance computer 3) with the first speed threshold. Thus, the optimised deflection commands are obtained, by the means 7, on the basis of the deviation between the recommended value of speed V2 and the first speed threshold. In this case, the adaptation of the deflection of control surfaces S1-Sn can be performed before take-off, or upon take-off, when the plane is still on the ground or flying;

or the actual value of the speed V2 (obtained by the set 2 of information sources during take-off when the airplane is flying) with the first speed threshold. Thus, the determination of the optimised deflection commands by the means 7 is performed on the basis of the actual value of speed V2. In other words, the system 1 waits for the airplane to be flying before determining the optimised deflection commands and therefore adapting the position of the control surfaces S1-Sn (initially in the take-off position selected by the performance computer 3).

FIG. 2 further depicts an example of the variations Copt of the take-off mass of the airplane as a function of speed V2, associated with an optimised take-off position Popt determined in accordance with this invention.

Besides, it will be noticed that at least part of the means of the system 1 in accordance with the invention can be integrated within the performance computer or within the flight management system of the airplane.

Further, the operations associated with means 4, 6 and 7 can be implemented automatically or manually, before take-off or not.

The invention claimed is:

1. A method for improving the performance of an aircraft during a take-off phase, said aircraft being provided with aerodynamic control surfaces (S1-Sn) able to have a plurality of separate predetermined take-off positions (P1, P2, P3), each of which corresponds to predefined deflections of said control surfaces (S1-Sn), wherein, before take-off, the following steps are automatically performed:

determining a recommended value of the initial rate of climb (V2) of said aircraft, such that at least the following regulatory safety criteria are respected upon take-off:

said recommended value of the initial rate of climb (V2) is at least equal to a first predefined speed threshold which is a function of the stalling speed of said aircraft;

said recommended value of the initial rate of climb (V2) is at least equal to a second predefined speed threshold which is a function of the minimum control speed with a breakdown engine;

the minimum gradient of climb of said aircraft with a breakdown engine is at least equal to a predefined gradient threshold; and selecting among said separate predetermined positions (P1, P2, P3) a take-off position and applying said take-off position to said control surfaces (S1-Sn), wherein:

a preliminary step comprises checking whether the safety criterion relating to said minimum gradient of climb with a breakdown engine is predominant with respect to other safety criteria using a theoretical representation (C1, C2, C3) of the take-off mass variations (M) of said aircraft according to the initial rate of climb (V2) thereof, combined with said selected take-off position (P1, P2, P3); and in the case where the minimum gradient of climb with a breakdown engine is a predominant safety criterion, the following steps are performed:
  i) comparing a predefined value of the initial rate of climb (V2) with said first speed threshold;
  ii) when the deviation between the predefined value of said initial rate of climb (V2) and said first speed threshold is substantially different from zero, determining optimised deflection commands of said control surfaces (S1-Sn), defining an optimal take-off position (Popt), so as to reduce said deviation upon take-off, with these optimised deflection commands being such that they generate an optimised deflection of said control surfaces less than that of said selected position; and
  iii) applying the optimised deflection commands thus determined to said control surfaces (S1-Sn), whatever said previously selected take-off position (P1, P2, P3).

2. The method according to claim 1, wherein, at step ii), said optimised deflection commands are such that said deviation is substantially equal to zero.

3. The method according to claim 1, wherein, at step ii), said optimised deflection commands are determined from at least some of the following information:
  the take-off mass (M) of said aircraft;
  the flight attitude of said aircraft;
  the engine thrust level of said aircraft;
  the initial rate of climb (V2);
  the outside temperature.

4. The method according to claim 1, wherein said theoretical representation (C1, C2, C3) is formed by the three following successive segments:
  a first vertical segment (Xa1, Xa2, Xa3) for which the regulatory safety criterion relating to said second predefined speed threshold is predominant;
  a second intermediate segment (Xb1, Xb2, Xb3) for which the regulatory safety criterion relating to said first predefined speed threshold is predominant; and
  a third segment (Xc1, Xc2, Xc3) for which the regulatory safety criterion relating to said minimum gradient of climb of said aircraft with a breakdown engine is predominant.

5. The method according to claim 1, wherein steps i), ii) and iii) are performed considering, as a predefined value, the recommended value of the initial rate of climb (V2), determined before take-off.

6. The method according to claim 1, wherein steps i), ii) and iii) are performed considering, as a predefined value, the actual value of the initial rate of climb (V2) upon take-off.

7. A system for improving the performance of an aircraft during a take-off phase, said aircraft being provided with aerodynamic control surfaces (S1-Sn) able to have a plurality of separate predetermined take-off positions (P1, P2, P3), each of which corresponds to predefined deflections of said control surfaces (S1-Sn), said system (1) comprising the following means (3) for which the corresponding operations are implemented, automatically, before take-off:
  means (3) for determining at least one recommended value of the initial rate of climb (V2) of said aircraft, such that at least the following regulatory safety criteria are respected during take-off:
    said recommended value of the initial rate of climb (V2) is at least equal to a first predefined speed threshold which is a function of the stalling speed of said aircraft;
    said recommended value of the initial rate of climb (V2) is at least equal to a second predefined speed threshold which is a function of the minimum control speed with a breakdown engine;
    the minimum gradient of climb of said aircraft with a breakdown engine is at least equal to a predefined gradient threshold; and
  means (3) for selecting, among said separate predetermined positions (P1, P2, P3), a take-off position to be applied to said control surfaces (S1-Sn); and
  means (A1-An) for applying said selected take-off position to said control surfaces (S1-Sn),
wherein:
  said system (1) further comprises:
    means (4) for checking, using a theoretical representation (C1, C2, C3) of the variations of the take-off mass (M) of said aircraft according to the initial rate of climb (V2) thereof, combined with said selected take-off position (P1, P2, P3), whether the safety criterion relating to said minimum rate of climb with a breakdown engine is predominant with respect to the other safety criteria; and
    means (6) for comparing a predefined value of the initial rate of climb (V2) with said first speed threshold, in the case where the minimum gradient of climb with a breakdown engine is a predominant safety criterion; and
    means (7) for determining, when the deviation between the predefined value of the initial rate of climb (V2) and said first speed threshold is substantially different from zero, optimised deflection commands of said control surfaces (S1-Sn) which define an optimised take-off position (Popt), such as to reduce said deviation upon take-off, these optimised deflection commands being such that they generate an optimised deflection of said control surfaces (S1-Sn) less than that of said selected take-off position;
  and said application means (A1-An) are further formed for applying the optimised deflection commands thus determined to said control surfaces (S1-Sn), whatever said previously selected take-off position.

8. An aircraft, comprising a system (1) as specified under claim 7.

* * * * *